United States Patent [19]
Forbes

[11] Patent Number: 5,855,175
[45] Date of Patent: Jan. 5, 1999

[54] SHELVING FOR CDS AND CASSETTES

[76] Inventor: Peter B. Forbes, 13 Macklin House Shackleton Close, London, Great Britain, SE23 3YP

[21] Appl. No.: 810,924

[22] Filed: Mar. 5, 1997

[30] Foreign Application Priority Data

Mar. 6, 1996 [GB] United Kingdom ............... 9604763

[51] Int. Cl.$^6$ ............................................. A47B 3/00
[52] U.S. Cl. .............................................. 108/180; 108/42
[58] Field of Search ........................... 8/180, 190, 153, 8/91, 42; 211/10, 186, 184

[56] References Cited

U.S. PATENT DOCUMENTS

| | | | |
|---|---|---|---|
| 905,578 | 12/1908 | Read | 211/10 X |
| 1,757,398 | 5/1930 | Squires | 108/42 |
| 2,366,677 | 1/1945 | Rosenthal | 108/180 X |
| 2,465,635 | 3/1949 | Conterio | 108/42 |
| 2,634,705 | 4/1953 | Mayes | 211/186 X |
| 3,160,282 | 12/1964 | Gunn | 211/184 |
| 3,307,505 | 3/1967 | Windross | 108/180 |
| 3,464,565 | 9/1969 | Nevai | 211/186 X |
| 5,474,190 | 12/1995 | Won-Kim | 211/184 X |

FOREIGN PATENT DOCUMENTS

| | | | |
|---|---|---|---|
| 488646 | 12/1952 | Canada | 211/186 |
| 0 139 989 | 8/1985 | Germany . | |

*Primary Examiner*—Jose V. Chen
*Attorney, Agent, or Firm*—Andrus, Sceales, Starke & Sawall

[57] ABSTRACT

Shelving mounted on a planar vertical surface, said shelving comprising:
i. an array of planar first members disposed about the vertical surface in a spaced apart relationship each first member being horizontal;
ii. an array of planar second members disposed about the vertical surface in a spaced apart relationship each second member being vertical.

each first member and each second member being provided with a plurality of slots, slots of the fist members interlocking with slots of the second members to define a framework, the second members subtending an angle in the rage of about 30° to about 60° to the vertical surface.

14 Claims, 6 Drawing Sheets

FIG. 10
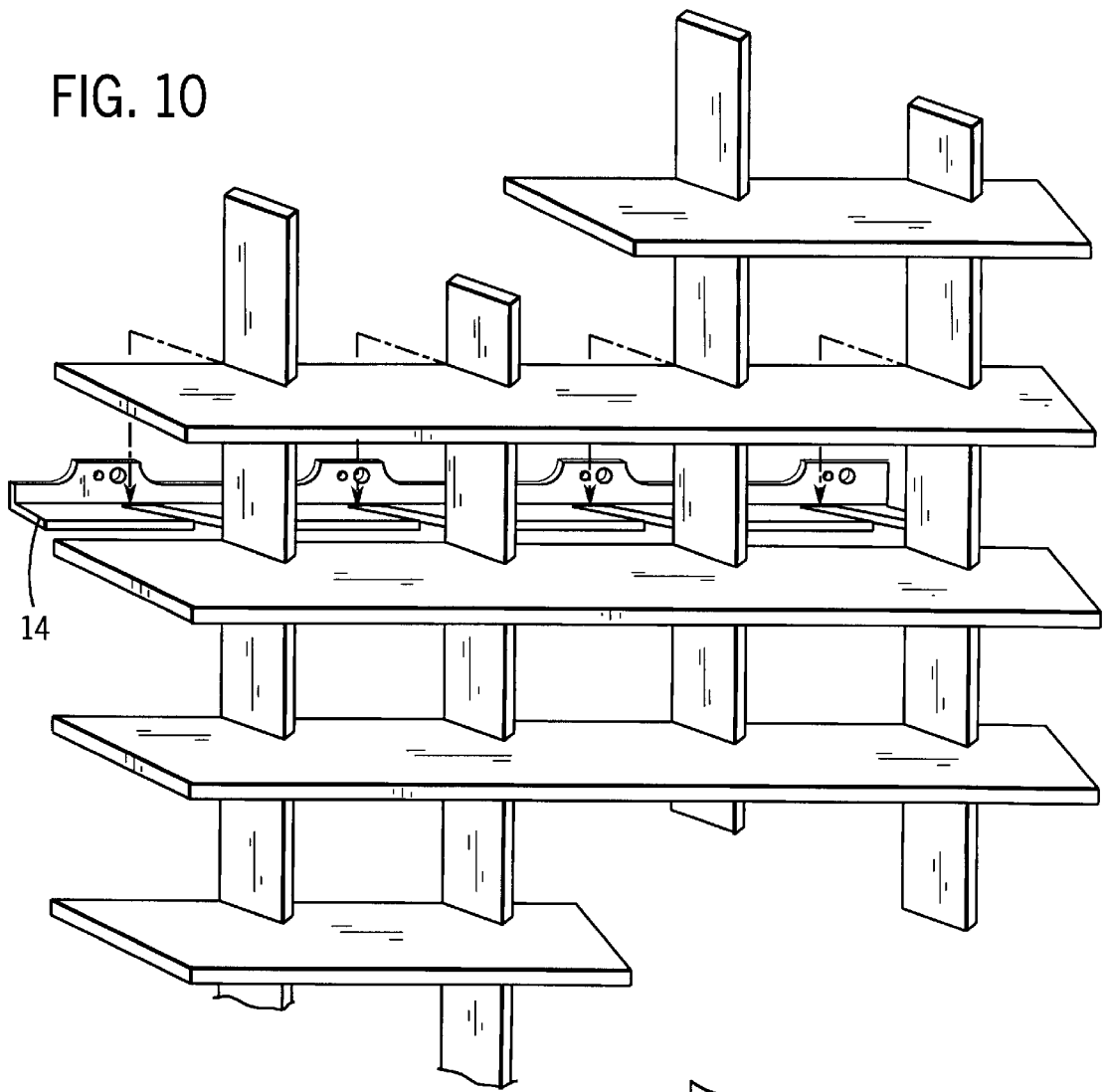
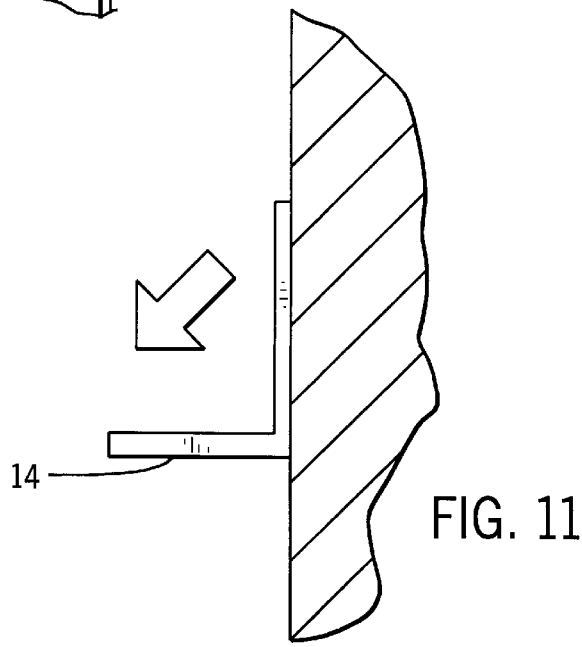
FIG. 11

SHELVING FOR CDS AND CASSETTES

This invention relates to shelving. More especially but not exclusively the invention relates to shelving for CDs or cassettes.

CDs and cassettes generally reside in individual boxes which have a distinctive front cover design and spine beating a title.

On known shelving the articles are generally stored with either the spine or the front cover visible.

When the spine is visible, it can be difficult to locate the desired article and remove it from the shelves.

When the front cover is visible, the article is easy to locate, but a much larger space is required to house the same number of articles. Articles displayed in this way are also easily jolted off the shelves. Many prior art shelves have a predetermined form and cannot be adopted to fit awkward spaces.

Many prior at shelves are aesthetically uninteresting.

The invention seeks to at least reduce some of the problems associated with the prior art.

According to an aspect of the invention there is provided shelving comprising a plurality of fist members for mounting horizontally on a support surface joined by at lent one second member for mounting vertically on a wall, characterised in that in use the second members 12 subtend an angle in the range 30° to 60° to the support surface especially 35° to 55°.

Embodiments of the invention will be described by way of non-limiting example by reference to the accompanying figures of which:

FIG. 10 is a perspective view of a further embodiment and wall mounting.

FIG. 11 is a cross section of a wall.

Figure 1:
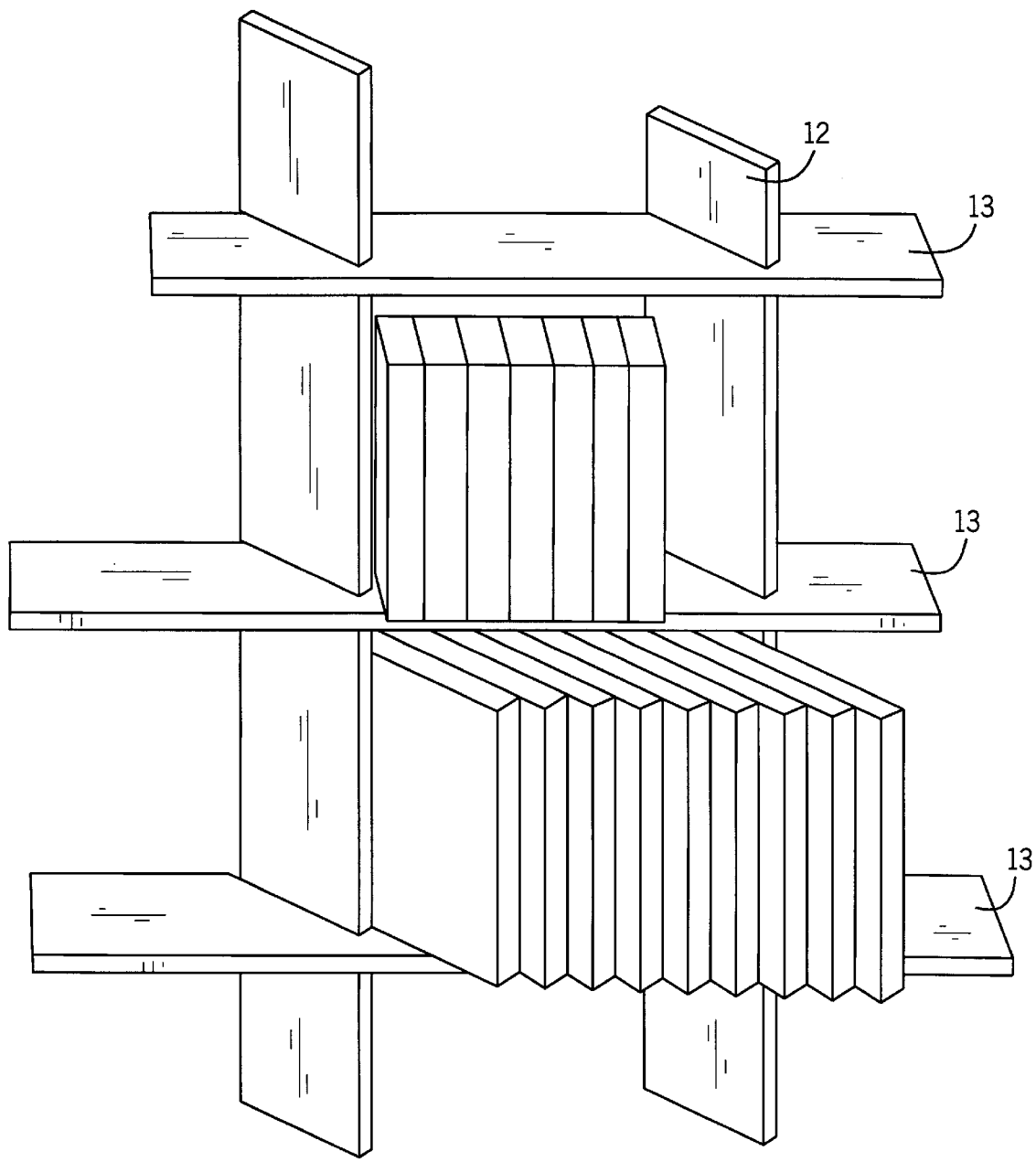
FIG. 1 is a perspective view of an embodiment with CDs and cassettes.

In general according to the invention there is provided a plurality of first members 13. First members 13 are generally rigid and planar and may for example be made of any of the materials customarily used for shelving such as wood, fibreboard or particleboard. Other materials will suggest themselves to the skilled.

According to the invention there are generally provided a plurality of second members 12 which are typically of similar material to the fit members 13.

The first and second members are joined to form a plurality of cells. As can be seen from FIG. 2 the cells can be bounded on each side by members 12, 13 or only on some. In the embodiments illustrated the first and second members interlock. In the illustrated embodiments notches or slots are formed in each of the members and a member is received in a notch or slot of a further member. This method of construction allows for quick and toolless assembly. It is also possible to disassemble and reconfigure the shelving, for example if it to be moved to a different location. However, it is possible to retain the members in position for example by glue or tacks. It will also be apparent that other ways of defining the cells may be employed.

One set of members preferably but not exclusively the first members 13 are generally intended to be positioned broadly horizontal and the other set broadly vertical. Positioning may well be undertaken by a purchaser of the article and may well in fact be positioned with the first members 13 far from vertical. The second member 12 will however generally be broadly perpendicular to the first member 13.

The spacing between pairs of first members is conveniently about 130 mm since this allows a sufficient clearance for CDs to be easily inserted and removed. The spacing between pairs of second members is conveniently about 168 mm since this allows a cell to receive nine CDs. Another multiple of just over 17 mm could be used. The depth of the members is preferably about 65 mm so that cassette boxes overhang the edge of the member for easy handling. It will be apparent that these dimensions are merely illustrative and may be changed especially if the shelving is intended for use with other products.

A feature of the invention is that at least one of the first and second members 12, 13 are not perpendicular to the wall on which they are mounted. One way of achieving this is to use the interlocking arrangement hereinbefore described and to provide the notches in the members at the required angle. For example in the illustrated embodiment the notches in the first members 13 are at about 55° and the notches in the second members about 90°. This allows a portion of the front of each work to be seen which is advantageous in trying to locate the desired work and may additionally add visual interest to the surroundings. The 45° angle specified is not critical. The closer the angle is to 90° however the less can the fronts be seen. The closer the angle to 0° the greater is the area required to store a given number of works. Preferably an angle in the range 35° to 65° especially 45° to 55° is adopted.

Figure 2:
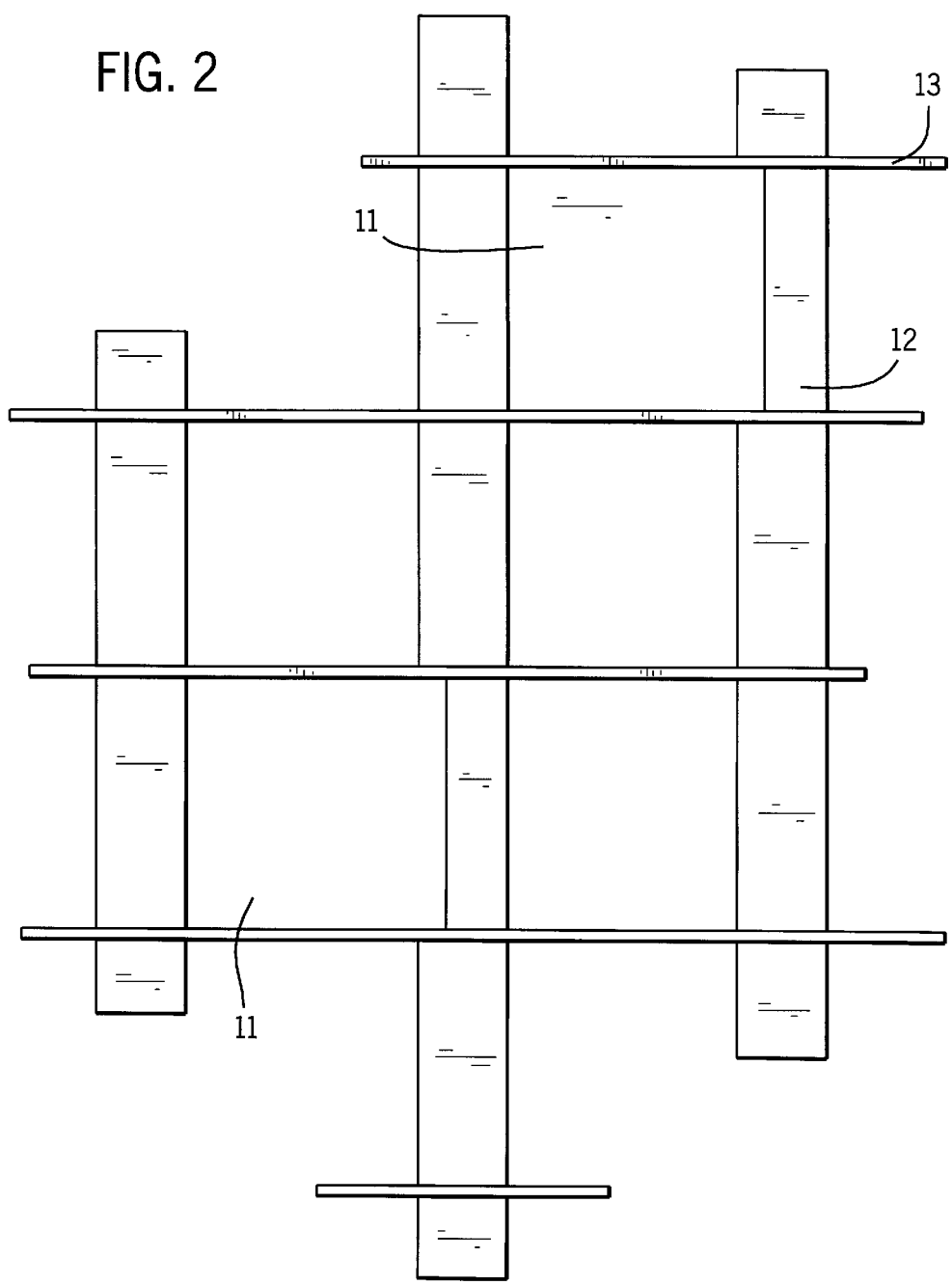
FIG. 2 is a plan view of a second embodiment.
Figure 3:
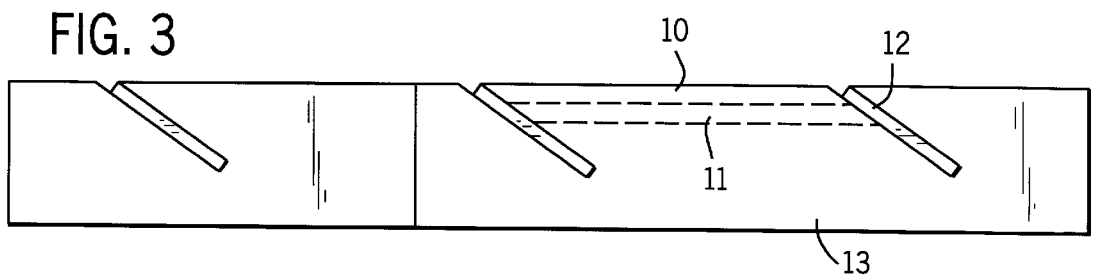
FIG. 3 is a side view of a first member.
Figure 4:
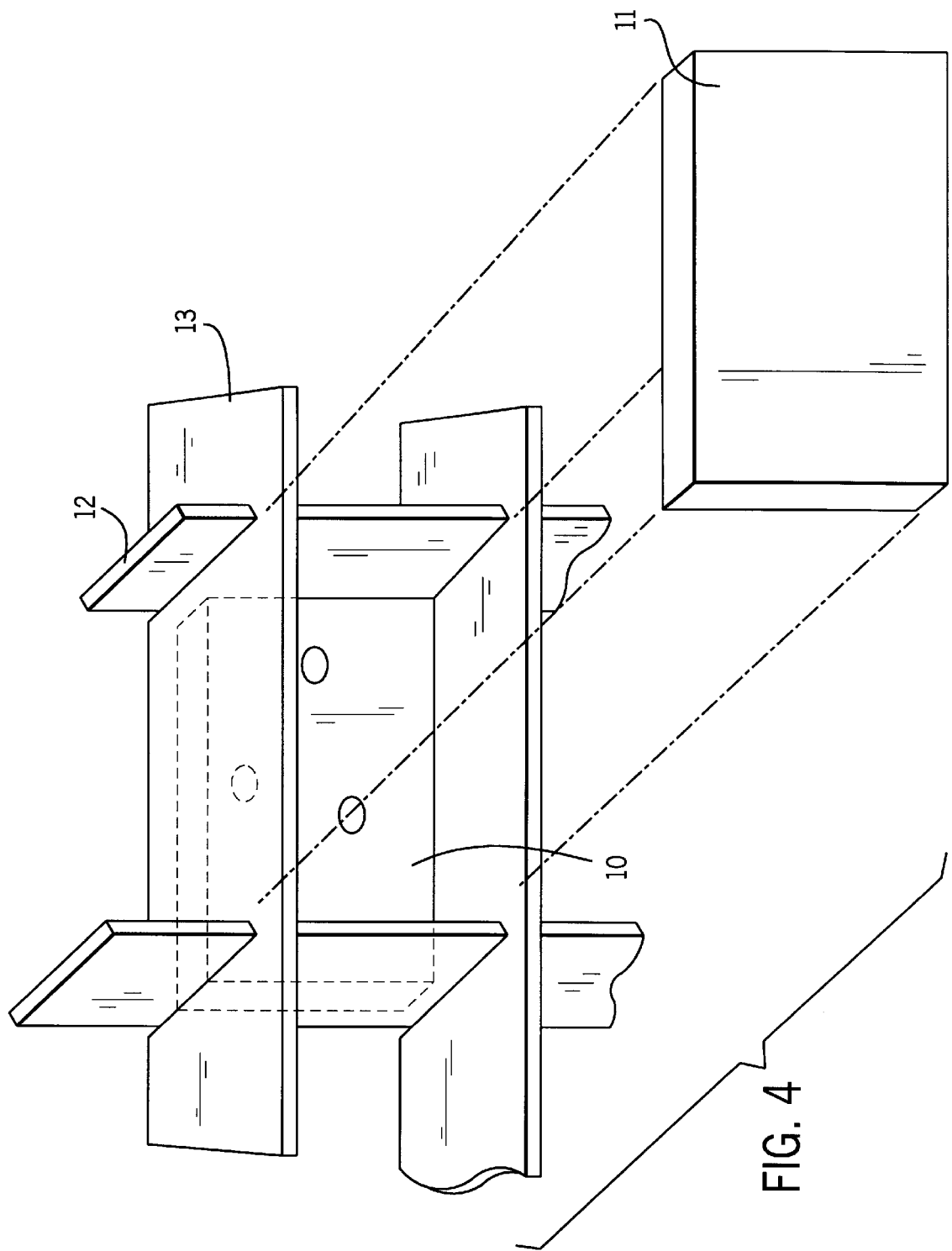
FIG. 4 is a partial view of a further embodiment with a back plate.
Figure 5:
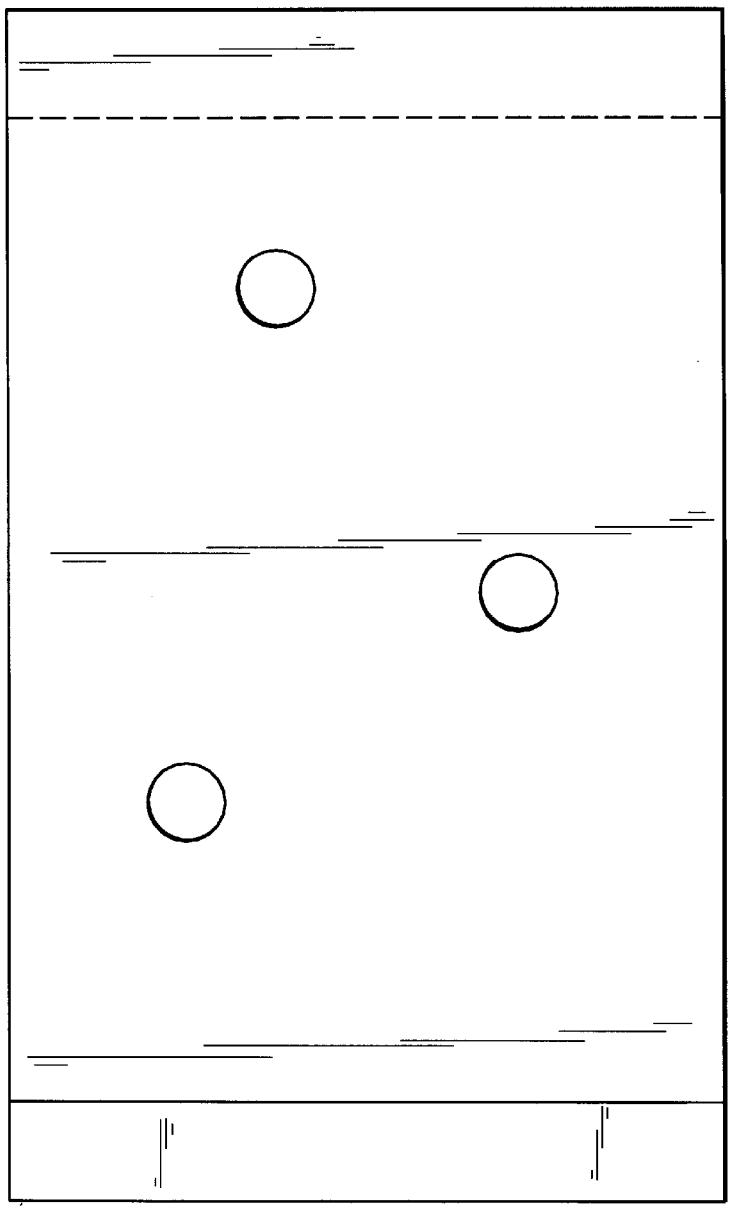
FIG. 5 is a front view of a back plate.
Figure 6:
FIG. 6 is a top view of a back plate.
Figure 7:
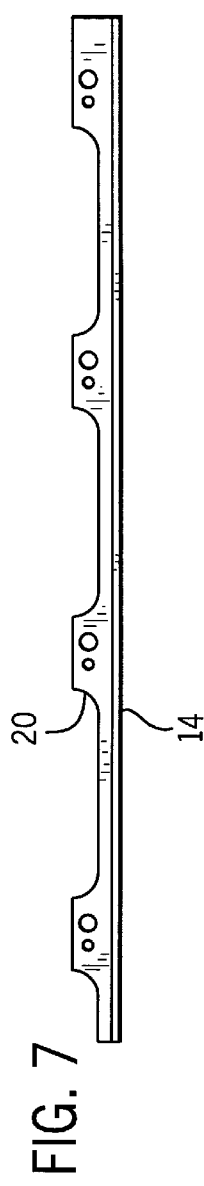
FIG. 7 is a front view of a wall mounting of the preferred embodiment.
Figure 8:
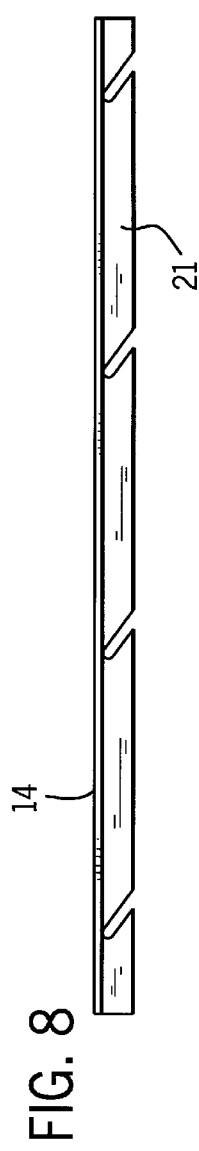
FIG. 8 is a plan view of a wail mounting of the preferred embodiment.
Figure 9:
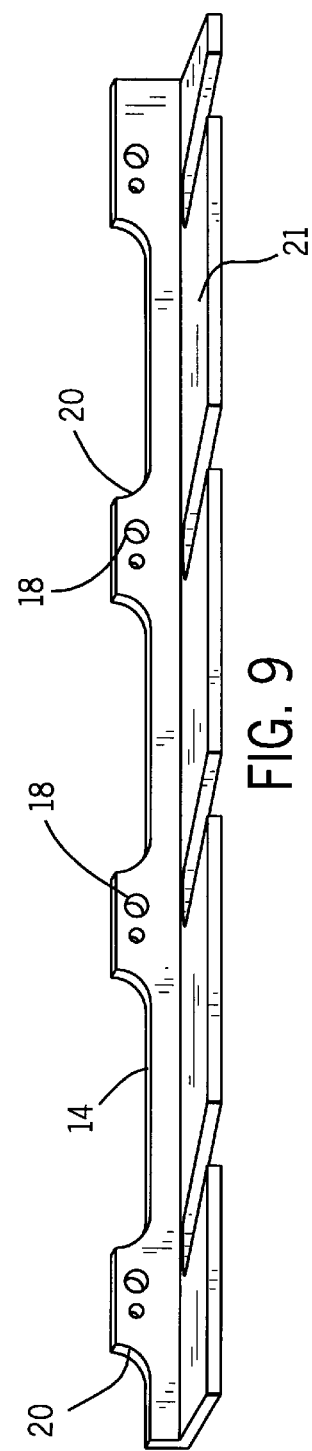
FIG. 9 is a perspective view of a wall mounting of the preferred embodiment.

It is not essential that the overall shape of the shelving be quadrilateral. As shown in FIG. 2 and FIG. 10, other shapes may be used. This can be done to fit the shelving into the available space or simply to give an attractive appearance.

Those skilled in the art will have no difficulty in mounting the shelving on a wall for example in conventional ways. A preferred way of mounting the shelving is with one or more back plates 11. Desirably the back plate 11 fills the back of a cell and is secured in position. Holes formed in the back plate 11 allow the device to be mounted for example using wall plugs and screws. In a preferred embodiment three holes are provided. In this preferred embodiment the second hole is displaced about 75 mm in a first direction and about 25 mm in a second direction perpendicular to the first direction from the first hole. The third hole is displaced about 20 mm in the first direction and 50 mm in the second direction from the first hole. This arrangement is preferred since with a conventional brick wall at least one hole will overlie brick rather than mortar. Fasteners are generally much better at load bearing when secured into brick rather mortar.

A more preferred way of mounting the shelving is with one or more L-shaped brackets 14. Brackets 14 have a support surface engaging face 20 and generally perpendicular to face 20 is ledge 21 which may be horizontal. Holes 18 formed in the bracket allow it to be affixed to a wall with nails, screws or the like.

The horizontal ledge is provided with notches of the size and orientation suitable to receive second members 12. First members rest on the ledge and may be held in situ by gravity.

Alternatively adhesive pads may be provided to secure the shelving to the bracket. It will be appreciated that other securing means such as abrasive strips may be used, thus more easily allowing the shelving to be taken down, reconfigured and returned.

Where holes 18 are formed above the ledge the assembly does not rotate about the arrow shown in FIG. 10. This means that the assembly can be secured to the wall with just nails.

It will be understood that those skilled in the art will have no difficulty in devising other embodiments of the invention.

I claim:

1. Shelving mounted on a planar surface, said shelving comprising:
   i. an array of planar first members disposed about a vertical surface in a spaced apart relationship, each first member being horizontal;
   ii. a plurality of planar second members disposed along the vertical surface in a spaced apart relationship at an angle in the range of 30° to 60° to the vertical surface, each second member being vertical;
   each first member and each second member being provided with a plurality of slots, slots of the first members interlocking with slots of the second members to define a framework.

2. Shelving as claimed in claim 1 including a wall mount comprising a vertical surface engaging face provided with a plurality of holes for nailing the wall mount to the vertical surface and a second mount surface orthogonal to the vertical surface for supporting the first members, the second mount surface including a plurality of spaced slots therein for receiving corresponding second members.

3. Shelving for mounting to a vertical planar supporting surface comprising a plurality of parallel first members having rear edges for mounting horizontally on the support surface joined by at least two second members for mounting on the support surface, the second members are provided with slots for receiving the first members wherein the second members are parallel to each other and extend at an angle in the range of 30° to 60° to said rear edges.

4. Shelving as claimed in claim 3 wherein each second member subtends an angle in the range of 35° to 55° to the vertical surface.

5. Shelving as claimed in claim 3 wherein ends of the second members subtend an angle in the range of 30° to 60° to the support surface.

6. Shelving as claimed in claim 3 wherein the first members are provided with slots for receiving the second member.

7. Shelving as claimed in claim 3 including a wall mount comprising a support surface engaging face provided with a plurality of holes for nailing the wall mount to the support surface and a second mount surface orthogonal to the support surface for mounting the first members and having slots for receiving the second members.

8. Shelving mounted on a planar vertical surface, said shelving comprising:
   i. an array of planar first members disposed about the vertical surface in a spaced apart relationship, each first member being horizontal;
   ii. a plurality of planar second members disposed in a parallel array, the second members being disposed about the vertical surface in a spaced apart relationship, each second member being vertical;
   each first member and each second member being provided with a plurality of slots, slots of the first members interlocutory with slots of the second members to define a framework, the second members subtending an angle in the range of 30° to 60° to the vertical surface.

9. A shelving unit mounted on a planer vertical surface, comprising:
   a plurality of spaced, generally planar shelves perpendicular to the vertical surface and including a plurality of spaced slots therein,
   a plurality of spaced, generally planar vertical supports perpendicular to the shelves and including a plurality of spaced slots therein, the slots of the vertical supports interlocking with the slots of the shelves to define a framework wherein each vertical support subtends an angle in the range of 30° to 60° to the vertical surface.

10. The shelving unit of claim 9 wherein each vertical support subtends an angle in the range of 35° to 55° to the vertical surface.

11. The shelving unit of claim 9 wherein the vertical supports are parallel to one another.

12. The shelving unit of claim 9 further comprising a wall mount for supporting the shelving unit on the vertical surface, the wall unit including a first vertical surface having a plurality of holes herein for facilitating the fastening of the wall mount to the vertical surface, and a second mount surface, perpendicular to the vertical surface, and having a plurality of spaced slots therein, each slot for receiving a corresponding vertical support therein.

13. The shelving unit of claim 12 wheren the slots in the mount surface of the wall mount are paralel to each other.

14. The shelving unit of claim 12 wherein the mount surface of the wall mount includes an upper surface, the upper surface engaging one of the shelves.

* * * * *